United States Patent [19]

Keller et al.

[11] Patent Number: 5,563,181

[45] Date of Patent: Oct. 8, 1996

[54] SILOXANE UNSATURATED HYDROCARBON BASED THERMOSETTING POLYMERS

[75] Inventors: Teddy M. Keller; David Y. Son, both of Alexandria, Va.

[73] Assignee: The United States of America as represented by the Secretary of the Navy, Washington, D.C.

[21] Appl. No.: 437,763

[22] Filed: May 9, 1995

[51] Int. Cl.$^6$ .................................................. C08F 2/46
[52] U.S. Cl. ............................ 522/99; 522/172; 528/32
[58] Field of Search ................................ 528/32; 522/99, 522/172

[56] References Cited

U.S. PATENT DOCUMENTS

| | | | |
|---|---|---|---|
| 2,671,099 | 3/1954 | Frisch et al. | 260/448.2 |
| 2,671,100 | 3/1954 | Frisch et al. | 260/448.2 |
| 2,671,101 | 3/1954 | Frisch et al. | 260/448.2 |
| 3,234,288 | 2/1966 | D'Alello | 260/606.5 |
| 3,397,221 | 8/1968 | Papetti | 260/448.2 |
| 3,457,222 | 7/1969 | Papetti | 260/46.5 |
| 3,457,223 | 7/1969 | Papetti | 260/46.5 |
| 3,488,371 | 1/1970 | Klebe | 260/448.2 |
| 3,542,730 | 11/1970 | Papetti et al. | 260/448.2 |
| 3,661,847 | 5/1972 | Chapman | 260/46.5 E |
| 3,733,298 | 5/1973 | Knalaneller | 260/46.5 E |
| 4,145,504 | 3/1979 | Hedaya et al. | 528/5 |
| 4,208,492 | 6/1980 | Hedaya et al. | 525/389 |
| 4,235,987 | 11/1980 | Peters | 528/5 |
| 4,269,757 | 5/1981 | Mine et al. | 260/37 |
| 4,857,490 | 8/1989 | Johnson | 501/96 |
| 4,946,919 | 8/1990 | Johnson | 526/285 |
| 4,965,332 | 10/1990 | Barton et al. | 528/25 |
| 5,231,158 | 7/1993 | Lewis et al. | 528/15 |
| 5,243,060 | 9/1993 | Barton et al. | 556/435 |
| 5,272,237 | 12/1993 | Keller et al. | 528/5 |
| 5,292,779 | 3/1994 | Keller et al. | 522/99 |
| 5,348,917 | 9/1994 | Keller et al. | 501/92 |
| 5,420,238 | 5/1995 | Ito et al. | 528/481 |

FOREIGN PATENT DOCUMENTS 2234517 6/1991 United Kingdom.

OTHER PUBLICATIONS

Zeldin et al., "Inorganic and Organometallic Polymers", American Chemical Society, Washington, DC, (1988), pp. 44–96.

Ijadi–Maghsoodi et al., "Efficient, One–Pot Synthesis of Silylene–Acetylene and Disilylene–Acetylene Preceramic Polymers from Trichloroethylene", Journal of Polymer Scienc: Part A: vol. 28, (1990), pp. 955–965.

Wynne et al., "Ceramics via Polymer Pyrolysis", Annual Review Material Science, (1984), 14, pp. 297–333.

Dvornic et al., "High Temperature Siloxane Elastomers", Huthig & Wepf Verlag Basel, N.Y., (1990), pp. 277–305.

Peters, "Poly(dodecarborane–siloxanes)", J. Macromol. Sci.–Rev. Macromol. Chem., C17(2), (1979), pp. 173–209.

Papetti et al., "A New Series of Organoborances. VII. The Preparation of Poly–m–carboranylenesiloxance", Journal of Polymer Science, Part A–1, vol. 4, (1966), pp. 1623–1636.

Ijadi–Maghsoodi etal., "Synthesis and Study of Silylene–Diacetylene Polymers", Macromolecules, vol. 23, No. 20, (1990), pp. 4486–4487.

Bock et al., "d–Orbital Effects in Silicon Substituted II–Electron Systems. Part XII. Some Spectroscopic Properties of Alkyl and Silyl Acetylenes and Polyacetylenes", J. Chem. Soc. (B), (1968), pp. 1158–1163.

Eastmond et al., "Silylation as a Protective Method for Terminal Alkynes in Oxidative Couplings–A General Synthesis of the Parent Polyynes", 28 Tetrahedron (1972), pp. 4601–4616.

Papetti et al., "A New Series of Organoboranes. VI. The Synthesis and Reactions of Some Silyl Neocarboranes", Inorganic Chemistry, vol. 3, No. 10, Oct. 1964, pp. 1448–1450.

Scott et al., "Icosahedral Carboranes. XV. Monomeric Carboranylenesiloxanes", Inorganic Chemistry, vol. 9, No. 11, (1970), pp. 2597–2600.

Callstrom et al., "Poly(ethynylene(3II–butyl–2, 5–thiophenediyl)–ethynylene): A Soluble Polymer Containing Diacetylene Units and Its Conversion to a Highly Cross–Linked Organic Solid", Macromolecules, vol. 21, No. 12, (1988), pp. 3528–3530.

Neenan et al., "Hypercross–Linked Organic Solids: Preparation from Poly(aromatic diacetylenes) and Preliminary Measurements of Their Young's Modulus, Hardness and Thermal Stability", Macromolecules, vol. 21, (1988), pp. 3525–3528.

Son et al., "Linear Siloxane Polymers as Precursors to High Temperature Materials", PMSE, (1994), 71, pp. 305–306.

Son et al., "Synthesis and Characterization of Linear Siloxane–Diacetylene Polymers", Macromolecules, vol. 28, No. 1, (1995), pp. 399–400.

Suzuki et al., "Synthesis and Properties of Silethynylene–Siloxane Alternating Copolymers", Eur. Polym. J., vol. 28, No. 11, (1992), pp. 1373–1376.

Komarov et al., "Acetylenic Siloxanes in the Grignard Synthesis", Izvestiya Akademii Nauk SSSR, Seriya Khimicheskaya, No. 3, Mar. (1972), pp. 698–699.

Parnell et al., "Oxidative Coupling as a Potential Route to Polymers of Group IV Acetylenes", Journal of Polymer Science, vol. 11, (1973), pp. 1107–1111.

Son et al., "Oxidatively Stable Linear Carborane–Siloxane–Diacetylene Copolymers", Polymer Preprints, vol. 36, No. 2, Aug. (1995), pp. 201–202.

Primary Examiner—Melvyn I. Marquis
Attorney, Agent, or Firm—Thomas E. McDonnell

[57] ABSTRACT

This invention relates to a new class of novel inorganic-organic hybrid thermoset polymers that are formed from linear inorganic-organic hybrid polymers of varying molecular weight. These new high temperature oxidatively stable thermosetting polymers are formed from linear polymeric materials having repeat units that contain at least one alkynyl group for cross-linking purposes and at least one siloxanyl group. These novel thermoset polymers contain an unsaturated cross-linked hydrocarbon moiety.

19 Claims, 2 Drawing Sheets

SILOXANE UNSATURATED HYDROCARBON BASED THERMOSETTING POLYMERS

BACKGROUND OF THE INVENTION

1. Field of the Invention

This invention relates to a new class of novel inorganic-organic hybrid thermosetting polymers that are formed from linear inorganic-organic hybrid polymers of varying molecular weight. These new high temperature oxidatively stable thermosetting polymers are formed from linear polymeric materials having repeat units that contain at least one alkynyl group for cross-linking purposes and at least one siloxanyl group. These novel thermosetting polymers can be further converted into ceramics at elevated temperatures.

2. Description of the Related Art

The cross linking of acetylenic polymers has been demonstrated by Neenan et al. in *Hypercross-Lined Organic Solids: Preparation from Poly(aromatic diacetylenes) and Preliminary Measurement of Their Young's Modulus, Hardness, and Thermal Stability* published in 21 MACROMOLECULES 3525–28 (1988), incorporated herein by reference. Other similar cross linking reactions are demonstrated by Callstrom et al. in *Poly[ethynlyene(3-n-butyl-2,5-thiophene-diyl)-ethynylene]: A Soluble Polymer Containing Diacetylene Units and Its Conversion to a Highly Cross-Linked Organic Solid* published in 21 MACROMOLECULES 3528–30 (1988), incorporated herein by reference.

The recent literature reflects continuing major research efforts to advance fundamental knowledge in high temperature material design. See K. J. Wynne and R. W. Rice, *Ceramics Via Polymer Pyrolysis* 14 ANN. REV. MAT. SCI. 297 (1984), incorporated herein by reference in its entirety and for all purposes.

In the search for high temperature oxidatively stable materials considerable attention has been given to polymers containing inorganic elements within the polymer. See Table II of Maghsoodi et al. in *Synthesis and Study of Silylene-Diacetylene Polymers* published in 23 MACROMOLECULES pp. 4486 (1990), incorporated 11 herein by reference in its entirety and for all purposes.

A majority of the siloxane or silyl polymers show elastomeric properties rather than properties of more rigid polymeric products like thermosetting polymers or ceramics. Thus, in addition to thermal stability, there is also a need for polymers that behave more as thermosets and ceramics, upon further polymerization, and less like elastomeric polymers.

There is a need for oxidatively stable materials that have thermosetting properties for making rigid components therefrom, such as engine parts, turbine blades and matrices. These components must withstand high temperatures and be oxidatively stable and have sufficient strength to withstand the stress put on such components. Thus, there is a need for siloxane cross-linked thermosetting polymeric materials that show high temperature stability where weight percentage loss is limited to 50% or less when heated in excess of 600° C. in an oxidative environment. In addition, there is a need for siloxane cross-linked thermosetting polymeric materials that behave more as rigid materials and less as elastomeric materials.

SUMMARY OF THE INVENTION

It is therefore an object of the present invention to provide cross-linked siloxane-alkenyl thermosetting polymers or thermosets that show less than 50% weight loss, in an oxidative environment, when heated to temperatures between 600°–1000° C.

It is another object of the present invention to provide cross-linked siloxane-alkenyl polymers that are high temperature stable thermosetting polymers or thermosets that behave more as rigid materials and less as elastomeric materials between 25°–1000° C.

BRIEF DESCRIPTION OF THE DRAWINGS

A more complete appreciation of the present invention and several of the accompanying advantages thereof will be readily obtained by reference to the following detailed description when considered in conjunction with the accompanying drawings, wherein.

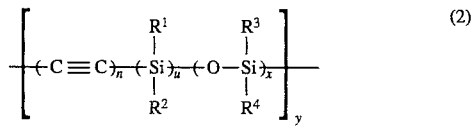

where n=2, u=x=1, $R^1=R^2=R^3=R^4=CH_3$, and y≈50 (MW≈10,000).

Figure 2:
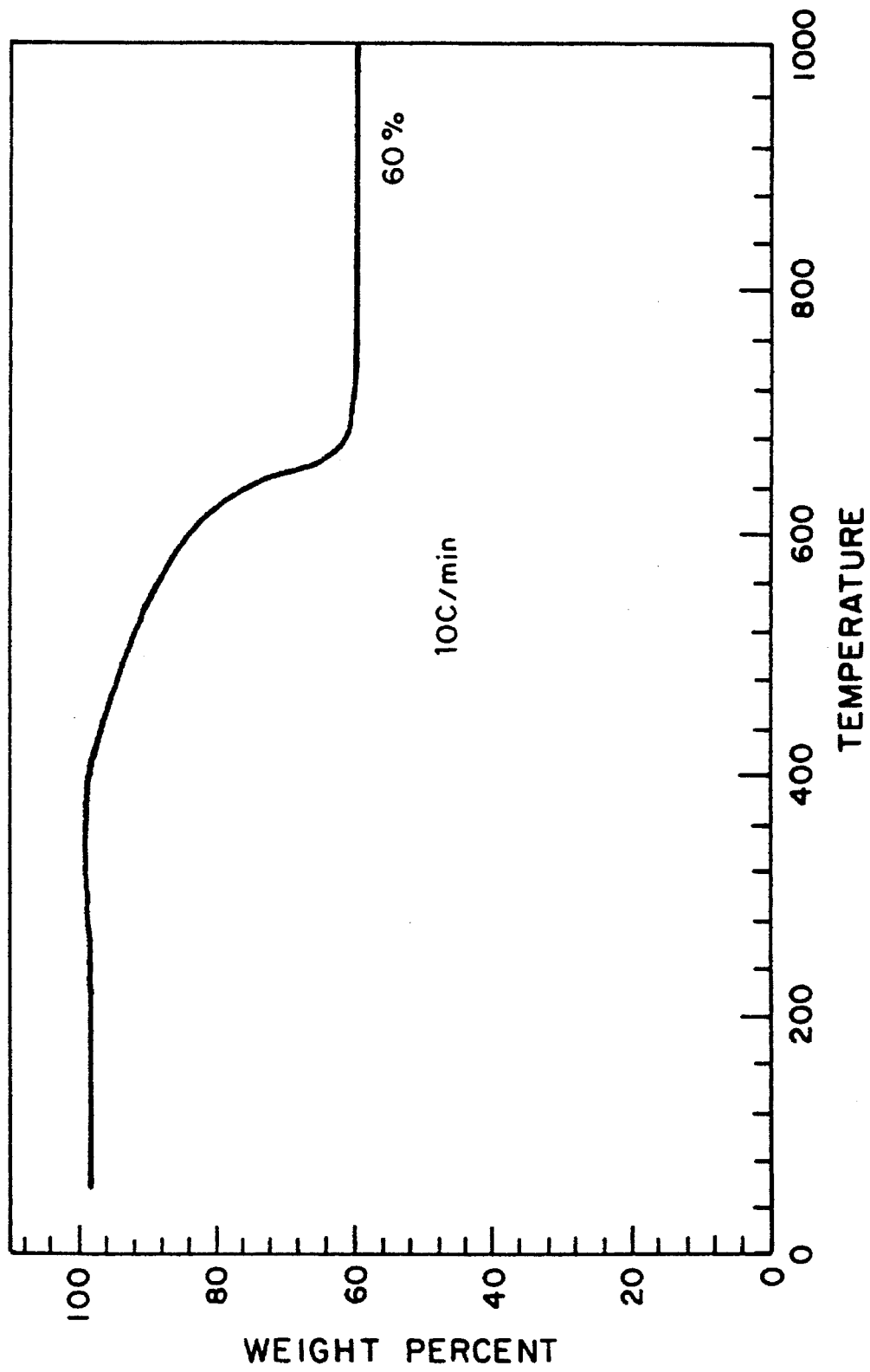

FIG. 2 is a thermogravimetric analytical (TGA) plot of weight % versus temperature in a nitrogen atmosphere for the polymer having the formula:

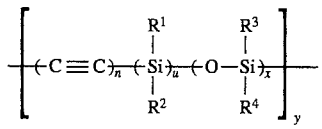

where n=2, u=1, x=2, $R^1=R^2=R^3=R^4=CH_3$, and y≈50 (MW≈10,000).

Figure 1:
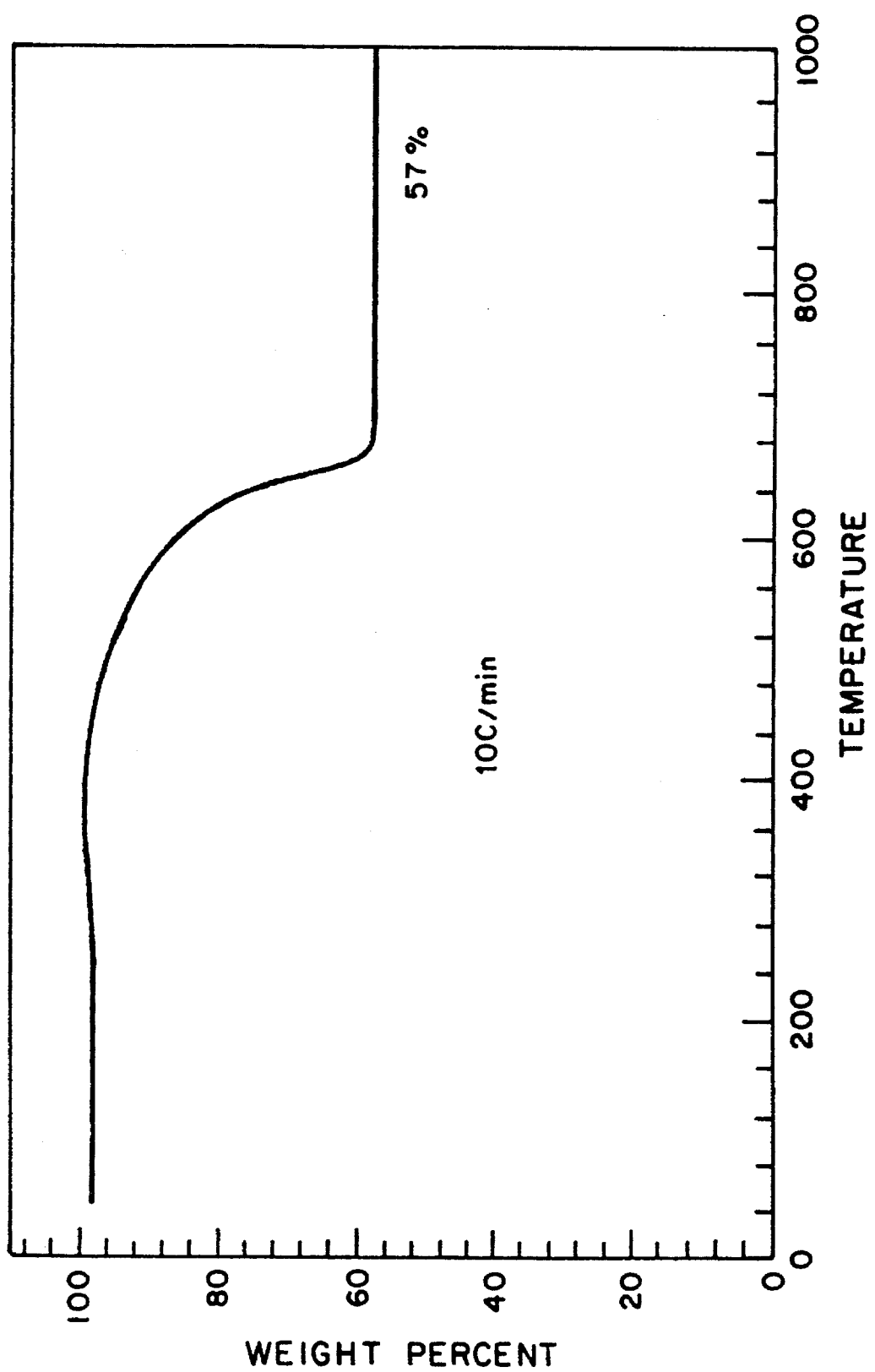
FIG. 1 is a thermogravimetric analytical (TGA) plot of weight % versus temperature in an oxidizing environment (air) of the thermoset made from the polymer (2)

The TGA plots in FIGS. 1 and 2 were obtained wherein the temperature of the respective polymers were raised at a rate of 10 degrees Centigrade per minute.

DETAILED DESCRIPTION OF THE PREFERRED EMBODIMENT

The following detailed description of the invention is provided to aid those skilled in the art in practicing the present invention. However, the following detailed description of the invention should not be construed to unduly limit the present invention. Variations and modifications in the embodiments discussed may be made by those of ordinary skill in the art without departing from the scope of the present inventive to discovery.

This invention relates to a new class of novel linear inorganic-organic hybrid polymers of varying molecular weight having the general formula:

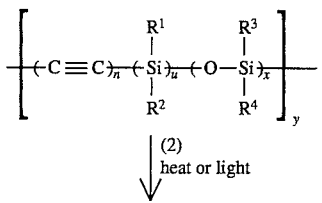

-continued

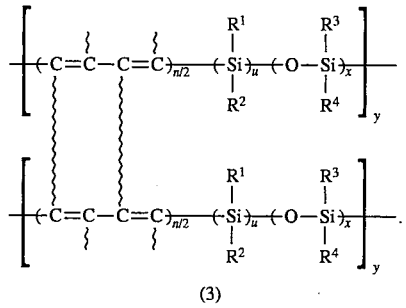

(3)

The conversion of the linear polymers (2) to the cross-linked polymers (3) is accomplished either by exposing the linear polymers (2) to heat or light. Thermal conversion of the carbon-to-carbon triple bonds in polymers (2) to form the thermosetting polymers (3) is dependent on both the curing temperature and the curing time. The heating of the linear polymers (2) is carried out over a curing temperature range sufficient for the cross-linking of the carbon-to-carbon triple bonds of the individual linear polymers (2) to occur resulting in the formation of a single mass of cross-linked polymers (3). The heating of the linear polymers (2) is carried out over a curing time sufficient for the cross linking of the carbon-to-carbon triple bonds of the individual linear polymers (2) to occur resulting in the formation of the cross-linked polymers (3). In general, the curing time is inversely related to the curing temperature. The typical temperature range, the preferred temperature range, the more preferred temperature range and the most preferred temperature range for the thermal conversion of linear polymers (2) to the cross-linked thermoset polymers (3) are, typically, 150°–450° C., 200°–400° C., 225°–375° C. and 250°–350° C., respectively. The typical curing time, the preferred curing time, the more preferred curing time, and the most preferred curing time for the thermal conversion of linear polymers (2) to the cross-linked thermoset polymers (3) are, typically, 1–48 hours, 2–24 hours, 8–12 hours and 1–8 hours, respectively.

The photocrosslinking process, of converting the carbon-to-carbon triple bonds of the linear polymers (2) into unsaturated cross-linked moieties necessary for forming the thermosetting polymers (3), is dependent on both the exposure time and the intensity of the light used during the photo-crosslinking process. Ultraviolet (UV) light is the most preferred wavelength of light used during the photo-crosslinking process. The exposure time of the linear polymers (2) to the UV light is inversely related to the intensity of the UV light used. The exposure time to the UV or to other light used is that time which is sufficient for the carbon-to-carbon triple bonds of the linear polymers (2) to be cross linked to form the thermosetting polymers (3). The intensity of the light used is that intensity which is sufficient for the carbon-to-carbon triple bonds of the linear polymers (2) to be cross linked to form the thermosetting polymers (3). Furthermore, the wavelength of the light used is not limited to the UV range. The wavelength of light used is that wavelength which is sufficient for the carbon-to-carbon triple bonds of the linear polymers (2) to be cross linked to form the thermosetting polymers (3). The typical exposure time, the preferred exposure time, the more preferred exposure time and the most preferred exposure time are, typically, 1–100 hours, 24–36 hours, 12–24 hours and 4–8 hours, respectively. Examples of the conversion of linear polymers (2) to the cross-linked thermosets (3) are given below.

The Patent Application of Keller et al. titled *Siloxane Unsaturated Hydrocarbon Based Polymers*, designated under Navy Case No.: 76,201 and filed on May 9, 1995, is incorporated herein by reference in its entirety and for all purposes. The Patent Application, filed on May 9, 1995, teaches one how to make the precursor linear polymers (2) needed for making the thermosets or thermosetting polymers (3), the subject of the present invention.

The general chemical scheme for synthesizing the linear polymers (2) is represented by the exemplary synthesis of (2') given below:

(step 1)

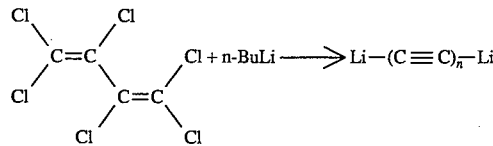

(step 2)

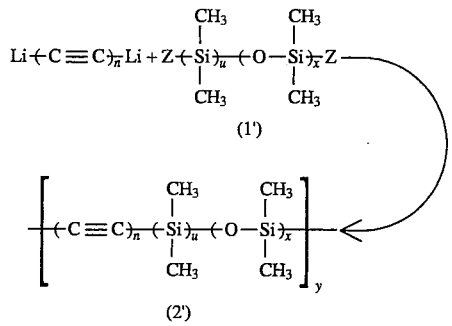

where:

(1) n=2, u=x=1, and y is a positive integer;

(2) —(C≡C)$_n$— represents a conjugated acetylenic moiety where n=2;

(3) $R^1=R^2=R^3=R^4=CH_3$;

(4) Z is selected from the group consisting of F, Cl, Br, I, acetyl and mixtures thereof;

(5) Li—(C≡C)$_n$—Li represents a dilithio salt where n=2; and (6) n-BuLi represents n-butyllithium.

Given the general scheme, step 1 involves forming a salt, for example, the dilithio salt of butadiyne by reacting 4 equivalents of n-BuLi with hexachlorobutadiene. To form the polymer (2'), step 2 involves reacting equal molar concentrations of the dilithiobutadiyne produced in step 1 with compound (1').

It should be noted that if trichloroethylene is used in step 1 instead of hexachlorobutadiene, a salt of ethyne or acetylene is formed in step i where n=1. Consequently, an ethynyl moiety is incorporated into the polymer produced in step 2 where n=1. By using hexachlorobutadiene in step 1, the salt of butadiyne is formed where n=2. In turn, a butadiyne moiety is incorporated into polymer (2') where n=2. In order to form a polymer where n=3, a salt of hexatriyne needs to be formed in step 1. The synthesis of the disodium salt of hexatriyne is given in the article by Bock and Seidl, *d-Orbital Effects in Silicon Substituted π-Electron Systems. Part XII. Some Spectroscopic Properties of Alkyl and Silyl Acetylenes and Polacetylenes*, J. CHEM. SOC. (B), 1158 (1968) at pp. 1159, incorporated herein by reference in its entirety and for all purposes. See also U.S. Pat. Nos. 5,272,237 and 5,292,779, each patent incorporated herein by reference in its entirety and for all purposes. Thus, by forming the appropriate alkynyl salt, the length of the alkynyl moiety, represented by the value of n, incorporated into the polymer formed in step 2 can be controlled. Typically, the value of n can be varied from 1 to 12. For example, n is an integer 1, 2, 3, 4, 5, 6, 7, 8, 9, 10, 11 or 12. Acetylenic derivatives having the general formula H(C≡C)$_n$H can be readily converted into the dilithio salts by reacting with n-butyllithium. The respective dilithio salts, with values of n varying from 1 to 12, can then be incorporated into the backbone of polymers (2) as shown in the aforementioned step 2. The value of n can be varied, typically, from 1 to 12, more often from 1 to 10 and 1 to 8, most often from 1 to 6 and, in particular, from 1 to 3 and 1 to 2. Acetylenic derivatives having the general formula H(C≡C)$_n$H can be readily formed by the synthesis given by Eastmond et al. in *Silylation as a Protective Method for Terminal Alkynes in Oxidative Couplings—A General Synthesis of the Parent Polyynes*, 28 TETRAHEDRON 4601 (1972), incorporated herein by reference in its entirety and for all purposes.

Furthermore, a variety of compounds can be produced that have structures similar to that of compound (1') shown in step 1. One variation includes replacing the methyl groups attached to the Si with other hydrocarbon or aromatic moieties. Typical reactions synthesizing disubstituted dichloro silanes of varying size (varying values of u) and having different R groups are known in the art:

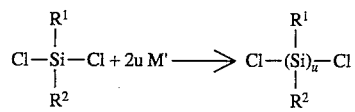

where M' is a group 1 metal or alloy. The above reaction is cited by ZELDIN ET AL. (EDITORS) in INORGANIC AND ORGANOMETALLIC POLYMERS, published by American Chemical Society, Washington, D.C. (1988) at 44 and 90, incorporated herein by reference in its entirety and for all purposes. The value of u can be varied, typically, from 1 to 1000, more often from 1 to 500 and 1 to 250, most often from 1 to 100 and 1 to 10, and, in particular, from 1 to 6. Another variation includes controlling the values of x in addition to that of u.

While leaving u=1, the value of x can be varied, typically, from 0 to 1000 or 1 to 1000, more often from 0 to 500 or 1 to 500 and 0 to 250 or 1 to 250, most often from 0 to 10 or 1 to 10, and, in particular, from 0 to 2 or 1 to 2 by the following proposed reaction scheme:

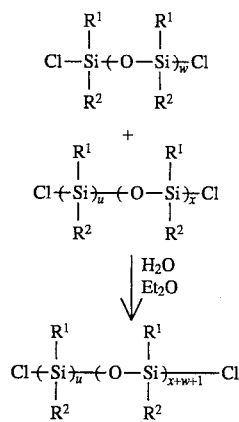

where x and w are integers greater than or equal to 0 (x≧0; w≧0) and u is a positive integer.

Following the scheme in the aforementioned steps 1 and 2, the novel linear polymers (2) can be formed by reacting a salt of an alkyne or a respective Grignard reagent with compound (1) as depicted by the exemplary reaction:

(step 2)

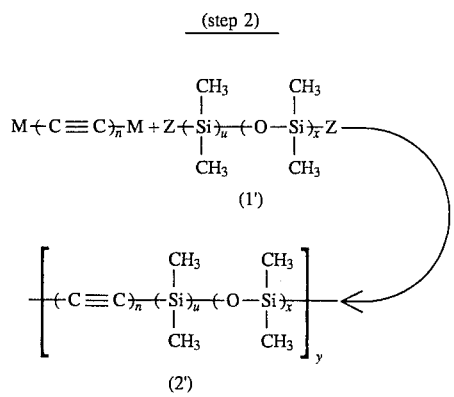

where:

(1) n is an integer 1, 2, 3, 4, 5, 6, 7, 8, 9, 10, 11 or 12 and u and y are positive integers;

(2) —(C≡C)$_n$— represents an unconjugated acetylenic moiety or a conjugated acetylenic moiety when n is an integer greater than 1;

(3) R$^1$, R$^2$, R$^3$ and R$^4$ represent alkyl, aryl, alkylaryl, haloalkyl, haloaryl moieties and mixtures thereof (e.g. hydrocarbon, halohydrocarbon, aromatic or haloaromatic moieties);

(4) Z is selected from the group consisting of F, Cl, Br, I, acetyl and mixtures thereof;

(5) M—(C≡C)$_n$—M represents a salt of an alkyne or the respective Grignard reagent where M is selected from the group consisting of Li, Na, K and MgX' where X' is selected from the group consisting of F, Cl, Br and I; and (6) x represents an integer greater than or equal to one (x≧1). The value of y can be varied. The value of y can be varied from 1–1000, 1–500, 1–250, and 1–100, respectively.

These novel linear polymers (2) exhibit sufficiently low viscosities either at room temperature or at their respective melting points (mp≈200° C.) to readily fill complex dies or shapes for forming parts therefrom. In addition, these polymers (2) can be further polymerized into thermosets and ceramics that form rigid shapes which are oxidatively stable at high temperatures above 600° C.

The following examples are included to aid those skilled in the art to fully understand the presently claimed invention. In no way are the examples intended to limit the scope or breadth of the claimed invention. Instead, the examples merely aid those skilled in the art to more fully understand the presently claimed invention without limiting the scope of the present invention.

EXPERIMENTAL DATA AND EXAMPLES

All reactions were carried out in an inert atmosphere unless otherwise noted. Solvents were purified by established procedures. 1,3-Dichlorotetramethyldisiloxane and 1,5-dichlorohexamethyltrisiloxane were obtained from Silar Laboratories and used as received. n-Butyllithium (2.5M in hexane) was obtained from Aldrich and titrated before use. Hexachlorobutadiene was obtained from Aldrich and distilled before use. Thermogravimetric analyses (TGA) were performed on a DuPont 951 thermogravimetric analyzer. Differential scanning calorimetry analyses (DSC) were performed on a DuPont 910 instrument. Unless otherwise noted, all thermal experiments were carried out at a heating rate of 10° C./min and a nitrogen flow rate of 50 mL/min. Infrared spectra were obtained using a Nicolet Magna 750 FTIR spectrophotometer. Gel-permeation chromatography (GPC) data were obtained using a Hewlett-Packard Series 1050 pump and two Altex μ-spherogel columns (size $10^3$ and $10^4$ Å respectively) connected in series. All values were referenced to polystyrene. $^1$H NMR and $^{13}$NMR spectroscopy were performed on a Bruker AC-300 spectrometer using CDCl$_3$ as solvent. Elemental analyses were performed by Galbraith Laboratories, Knoxville, Tenn.

Examples of the Synthesis of Linear Polymers (2)

EXAMPLE 1

Preparation of 1,4-dilithio-1,3-butadiyne.

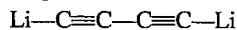

A hexane solution of n-BuLi (10.6 mL of a 2.5M solution, 26.5 mmol) was added to a flask containing THF (5 mL) cooled in a dry ice/acetone bath. Subsequently, hexachlorobutadiene (0.99 mL, 6.3 mmol) was added dropwise via syringe, resulting in the formation of a heavy precipitate. After completion of addition, the cold bath was removed and the reaction mixture was stirred at room temperature for two hours. The resulting dark-brown mixture was used without further treatment.

EXAMPLE 2

Preparation of Polymer 2 wherein (n=2; u=1; x=1, $R^1=R^2=R^3=R^4=CH_3$; and y>0)

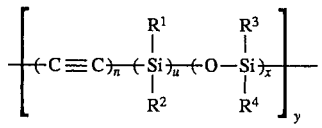

A mixture of 1,4-dilithio-1,3-butadiyne (6.3 mmol) in THF/hexane was cooled in a dry ice/acetone bath. To this mixture, 1,3-dichlorotetramethyldisiloxane (1.24 mL, 6.3 mmol) was added dropwise over 15 min. After addition, the cold bath was removed and the mixture was stirred at room temperature for two hours. The tan mixture was poured into 20 mL of ice-cooled saturated aqueous ammonium chloride solution with stirring. The mixture was filtered through a Celite pad and the layers were separated. The aqueous layer was extracted twice with Et$_2$O and the combined organic layers were washed twice with distilled water and once with saturated aqueous NaCl solution. The dark brown organic layer was dried over anhydrous magnesium sulfate and filtered. Most of the volatiles were removed at reduced pressure and the residue was heated at 75° C. for three hours at 0.1 torr to give 2 as a thick, dark brown material (1.04 g, 92%). Polymer 2 slowly solidifies on standing at room temperature and liquefies at approximately 70° C. $^1$H NMR (ppm) 0.30 (s, 12H, —Si(CH$_3$)); $^{13}$C NMR (ppm) 1.7, 1.9 (—Si(CH$_3$)), 84.9 (—Si—C≡C—), 86.9 (—Si—C≡C—). Anal. Calcd. for (C$_6$H$_{12}$OSi$_2$)$_n$: C, 53.31; H, 6.66; Si, 31.16. Found: C, 55.81; H, 7.61; Si, 27.19. Mw=10700, Mn=2300, polydispersity=4.7.

EXAMPLE 3

Preparation of Polymer 2 wherein (n=2; u=1; x=2, $R^1=R^2=R^3=R^4=CH_3$; and y>0)

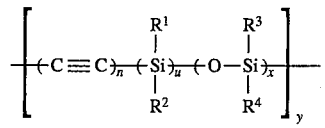

The same procedure that was used in the preparation of 9 was used in the reaction of 6.3 mmol of 1,4-dilithio-1,3-butadiyne with 1,5-dichlorohexamethyltrisiloxane (1.72 mL, 6.3 mmol). The same workup procedure yielded 2 as a slightly viscous dark brown oil ( 1.44 g, 90% ). $^1$H NMR (ppm) 0.11 (s, 6H, —C≡C—SiOSi(CH$_3$)$_2$—), 0.26 (s, 12H, —C≡C—Si(CH$_3$)$_2$—); $^{13}$C NMR (ppm) 85.2 (—Si—C≡C—), 86.8 (—Si—C≡C—). Anal. Calcd. for (C$_{10}$H$_{18}$O$_2$Si$_3$)$_n$: C, 47.22; H, 7.08; Si, 33.12. Found: C, 48.98; H, 7.59; Si, 29.45. Avg. Mw (Weight average molecular weight)=9900, Mn (number average molecular weight)= 2500, polydispersity=4.0.

Examples of Conversions to Cross-Linked Thermosets (3)

EXAMPLE 4

Thermoset 3 from Polymer 2.

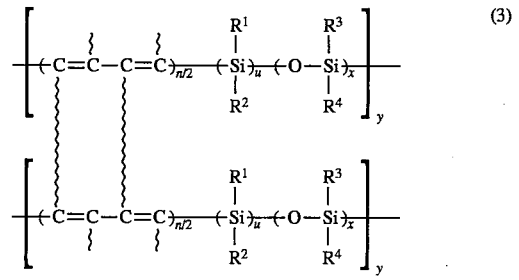

wherein n is 2, u is 1, and x is 1 and y is about 50. A sample of 2 (1.00 g) was placed in an aluminum pan and degassed under vacuum for 15 min at 110° C. Afterwards, the sample was placed in a tube furnace under argon and cured at 150 for 2.5 h, 200 for 5 h, for 2 h, and 400° C. for 2 h. This curing process produced a void-free, dark-brown hard solid, 3 (0.94 g, 94%) according to the following reaction:.

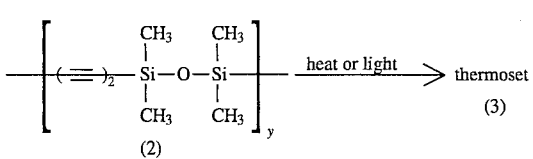

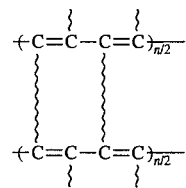

EXAMPLE 5

Thermoset 3 from Polymer 2

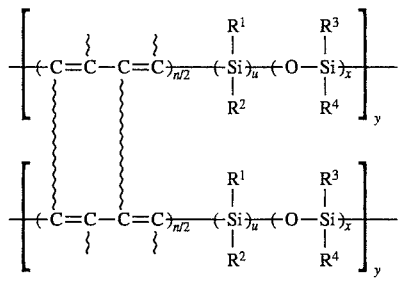

wherein n=2, u=1, x=2 and y is about 50. A sample of 2 (1.00 g) was placed in an aluminum pan and degassed under vacuum at room temperature. Afterwards, the sample was placed in a tube furnace under argon and cured at 150 for 2.5 h, 225 for 5 h, for 2 h, and 400° C. for 2 h. This curing process produced a void-free, dark-brown hard solid, 3 (0.90 g, 90%) according to the reaction:

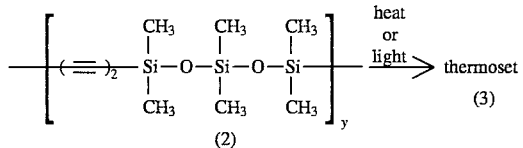

We claim:

1. An organosiloxane thermoset polymer having a repeating unit comprising at least one siloxanyl groups, and at least one unsaturated cross-linked moiety, said repeating unit being represented by the formula:

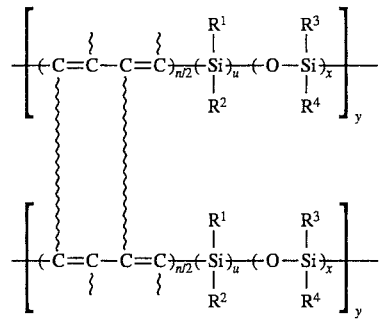

wherein:

(1) n is an integer 1, 2, 3, 4, 5, 6, 7, 8, 9, 10, 11 or 12 and u and y are positive integers;

(2)

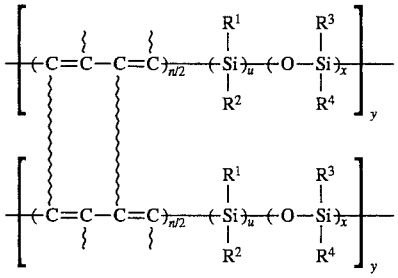

represents said unsaturated cross-linked moiety;

(3) $R^1$, $R^2$, $R^3$ and $R^4$ are chemical groups selected from the group consisting of hydrocarbon, halohydrocarbon, aromatic, haloaromatic and mixtures thereof; and (4) x represents an integer greater than or equal to one.

2. The thermoset polymer of claim 1 wherein said $R^1$, said $R^2$, said $R^3$ and said $R^4$ may be the same or different and wherein each of said $R^1$, said $R^2$, said $R^3$ and said $R^4$ represents a hydrocarbon group or halohydrocarbon group being selected from the group consisting of alkyl, aryl, alkylaryl, haloalkyl, haloaryl and mixtures thereof.

3. The thermoset polymer of claim 1 wherein said u, and said y are integers from 1 to 1000 and said x is an integer from 1 to 1000 and said n is an integer from 1 to 12.

4. The thermoset polymer of claim 1 wherein said u, and said y are integers from 1 to 500 and said x is an integer from 1 to 500 and said n is an integer from 1 to 10.

5. The thermoset polymer of claim 1 wherein said u, and said y are integers from 1 to 250 and said x is an integer from 1 to 250 and said n is an integer from 1 to 8.

6. The thermoset polymer of claim 1 wherein said u, and said y are integers from 1 to 100 and said x is an integer from 1 to 100 and said n is an integer from 1 to 6.

7. The thermoset polymer of claim 1 wherein said n is an integer from 1 to 3 and said u is an integer from 1 to 10 and said x is an integer from 1 to 10.

8. The thermoset polymer of claim 1 wherein said n is an integer from 1 to 2 and said u is an integer from 1 to 10 and said x is an integer from 1 to 10.

9. The thermoset polymer of claim 1 wherein n is an integer 3, 4, 5, 6, 7, 8, 9, 10, 11 or 12 and u is an integer from 1 to 10 and x is an integer from 1 to 10.

10. The thermoset polymer of claim 1 wherein said n equals 1 and said u is an integer from 1 to 6 and said x is an integer from 1 to 2.

11. The thermoset polymer of claim 1 wherein n is between 3 to 12, u is from 1 to 10, x is between 1 to 10 and y is from 40 to 150.

12. A method for preparing an organosiloxane thermoset polymer having the formula:

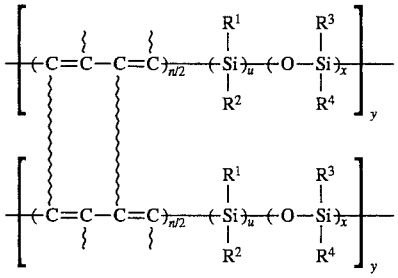

wherein:

(1) n is an integer 1, 2, 3, 4, 5, 6, 7, 8, 9, 10, 11 or 12 and u and y are positive integers;

(2)

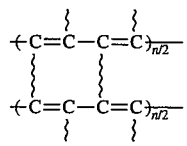

represents an unsaturated cross-linked moiety;

(3) $R^1$, $R^2$, $R^3$ and $R^4$ represent chemical groups selected from the group consisting of hydrocarbon, halohydrocarbon, aromatic, haloaromatic and mixtures thereof; and (4) x represents an integer greater than or equal to one; comprising the steps of:

providing a siloxane-acetylenic linear polymer having the formula:

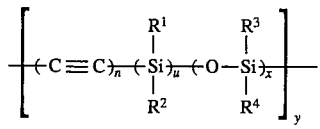

wherein:

(1) $R^1$, $R^2$, $R^3$ and $R^4$ are chemical groups selected from the group consisting of hydrocarbon, halohydrocarbon, aromatic, haloaromatic and mixtures thereof;

(2) —(C≡C)$_n$— represents an unconjugated acetylenic moiety or a conjugated acetylenic moiety when n is greater than 1;

(3) n is an integer from 1 to 12 and u and y are positive integers; and (4) x is an integer greater than or equal to one; and heating said linear polymer at a temperature, and for a time, sufficient for cross linking of said acetylenic moieties of said linear polymer to form said unsaturated cross-linked moiety to form said organosiloxane thermoset polymer.

13. The process of claim 12 wherein said temperature of said heating step is from 150°–450° C. and said time is from 1–8 hours.

14. The process of claim 12 wherein said temperature of said heating step is from 200°–400° C. and said time is from 4–12 hours.

15. The process of claim 12 wherein said temperature of said heating step is from 225°–375° C. and said time is from 2–24 hours.

16. The process of claim 12 wherein said temperature of said heating step is from 250°–350° C. and said time is from 1–48 hours.

17. A method for preparing an organosiloxane thermoset polymer having the formula:

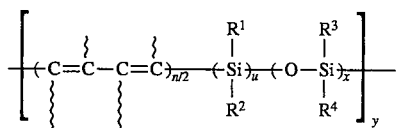

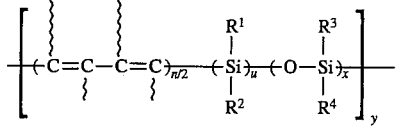

wherein:

n is an integer 1, 2, 3, 4, 5, 6, 7, 8, 9, 10, 11 or 12 and u and y are positive integers;

(2)

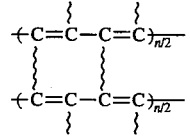

represents an unsaturated cross-linked moiety;

(3) $R^1$, $R^2$, $R^3$ and $R^4$ are chemical groups selected from the group consisting of hydrocarbon, halohydrocarbon, aromatic, haloaromatic and mixtures thereof; and (4) x represents an integer greater than or equal to one; comprising the steps of:

providing a siloxane-acetylenic linear polymer having the formula:

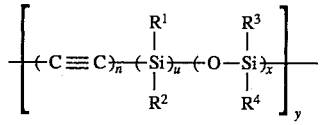

wherein:

$R^1$, $R^2$, $R^3$ and $R^4$ are chemical groups selected from the group consisting of hydrocarbon, halohydrocarbon, aromatic, haloaromatic and mixtures thereof;

(2) —(C≡C)$_n$— represents an unconjugated acetylenic moiety or a conjugated acetylenic moiety when n is greater than 1;

(3) n is an integer from 1 to 12 and u and y are positive integers; and (4) x is an integer greater than or equal to one; and exposing said linear polymer to light at a wavelength, and for a time, sufficient to cross-link said acetylenic moieties of said linear polymer to form said unsaturated cross-linked moiety to form said organosiloxane thermoset polymer.

18. The process of claim 17 wherein said wavelength of said exposing step is in the ultraviolet range.

19. The process of claim 17 wherein said time of said exposing step is from 1–100 hours.

* * * * *